United States Patent
Chen et al.

(10) Patent No.: US 11,822,167 B2
(45) Date of Patent: Nov. 21, 2023

(54) DISPLAY MODULE AND DISPLAY DEVICE

(71) Applicants: Beijing BOE Optoelectronics Technology Co., Ltd., Beijing (CN); BOE Technology Group Co., Ltd., Beijing (CN)

(72) Inventors: Xiuyun Chen, Beijing (CN); Lingyu Sun, Beijing (CN); Jingjun Du, Beijing (CN); Peng Zhong, Beijing (CN); Tingxiu Hou, Beijing (CN); Jian Zhao, Beijing (CN); Min Wang, Beijing (CN); Fei Liang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/764,921

(22) PCT Filed: Mar. 10, 2021

(86) PCT No.: PCT/CN2021/079856
§ 371 (c)(1),
(2) Date: Mar. 29, 2022

(87) PCT Pub. No.: WO2021/213042
PCT Pub. Date: Oct. 28, 2021

(65) Prior Publication Data
US 2023/0025151 A1    Jan. 26, 2023

(30) Foreign Application Priority Data

Apr. 23, 2020   (CN) .......................... 202010325581.1

(51) Int. Cl.
*G02F 1/133* (2006.01)
*G02F 1/1685* (2019.01)
(Continued)

(52) U.S. Cl.
CPC ...... *G02F 1/13318* (2013.01); *G02F 1/13439* (2013.01); *G02F 1/133615* (2013.01);
(Continued)

(58) Field of Classification Search
CPC ... G02F 1/13318; G02F 1/1685; G02F 1/1676
See application file for complete search history.

(56) References Cited

U.S. PATENT DOCUMENTS

2010/0060974 A1* 3/2010 Wang .................. G02F 1/16756
359/290
2011/0141551 A1   6/2011 Uchida et al.
(Continued)

FOREIGN PATENT DOCUMENTS

| CN | 201740953 U | 2/2011 |
| CN | 102782572 A | 11/2012 |

(Continued)

OTHER PUBLICATIONS

CN 202010325581.1 first office action.
(Continued)

*Primary Examiner* — Lucy P Chien
(74) *Attorney, Agent, or Firm* — IPro, PLLC

(57) ABSTRACT

A display module and a display device are provided in the embodiments of the present disclosure. The display module includes a display panel, the display panel includes a first surface and a second surface opposite to each other, at least one of the first surface and the second surface is a display surface, and the display module further includes an optical modulation structure arranged on at least one of the first surface and the second surface of the display panel. The optical modulation structure includes: a first transparent substrate and a second transparent substrate arranged opposite to each other, a charged particle arranged between the first transparent substrate and the second transparent sub- (Continued)

strate, and a first transparent electrode structure arranged between the first transparent substrate and the second transparent substrate and configured to form an electric field for driving the charged particle to move.

18 Claims, 5 Drawing Sheets

(51) Int. Cl.
  *G02F 1/1676* (2019.01)
  *G02F 1/13357* (2006.01)
  *G02F 1/1343* (2006.01)
  *G02F 1/167* (2019.01)
  *G09F 9/35* (2006.01)

(52) U.S. Cl.
  CPC ............ *G02F 1/167* (2013.01); *G02F 1/1676* (2019.01); *G02F 1/1685* (2019.01); *G02F 2201/44* (2013.01); *G02F 2203/01* (2013.01); *G09F 9/35* (2013.01)

(56) References Cited

U.S. PATENT DOCUMENTS

| | | |
|---|---|---|
| 2012/0026434 A1 | 2/2012 | Chen |
| 2012/0320298 A1 | 12/2012 | Suzuki et al. |
| 2013/0208345 A1* | 8/2013 | Song .................. G02F 1/167 359/296 |
| 2013/0271811 A1* | 10/2013 | Lam .................... G02B 5/23 359/266 |
| 2014/0036176 A1 | 2/2014 | Shinkai et al. |
| 2018/0188612 A1 | 7/2018 | Gao et al. |
| 2019/0302532 A1 | 10/2019 | Zhong et al. |

FOREIGN PATENT DOCUMENTS

| | | |
|---|---|---|
| CN | 102998841 A | 3/2013 |
| CN | 104133319 A | 11/2014 |
| CN | 104849912 A | 8/2015 |
| CN | 105866998 A | 8/2016 |
| CN | 108761898 A | 11/2018 |
| CN | 108919586 A | 11/2018 |
| CN | 109920831 A | 6/2019 |
| CN | 209281113 U | 8/2019 |
| CN | 110520791 A | 11/2019 |
| CN | 111489637 A | 8/2020 |
| JP | 2011142065 A | 7/2011 |
| WO | 2012153779 A1 | 11/2012 |

OTHER PUBLICATIONS

CN 202010325581.1 Decision of Rejection.
PCT/CN2021/079856 international search report and written opinion.

* cited by examiner

DISPLAY MODULE AND DISPLAY DEVICE

CROSS-REFERENCE TO RELATED APPLICATIONS

The present application is the U.S. national phase of PCT Application No. PCT/CN2021/079856 filed on Mar. 10, 2021, which claims priority to Chinese Patent Application No. 202010325581.1 filed in China on Apr. 23, 2020, which is incorporated herein by reference in its entirety.

TECHNICAL FIELD

The present disclosure relates to the field of display technology, in particular to a display module and a display device.

BACKGROUND

A transparent display product has been widely used in exhibition stands, home appliances, and special consumer goods. The transparent display product has a display effect strongly dependent on external light, and as such it is necessary to arrange an auxiliary light source. Due to a blocking effect on the transparent display, a conventional backlight is no longer applied to the transparent display product. In a transparent display product having an edge-type auxiliary light source, it completely depends on an optical waveguide inside the display panel, and has a low transmission efficiency and uneven brightness and imperfect user experience.

SUMMARY

A display module and a display device are provided in the embodiments of the present disclosure, so as to improve the image uniformity of the display module.

The technical solutions in the embodiments of the present disclosure are as follows.

The present disclosure provides in some embodiments a display module. The display module includes a display panel, the display panel includes a first surface and a second surface opposite to each other, at least one of the first surface and the second surface is a display surface, and the display module further includes an optical modulation structure arranged on at least one of the first surface and the second surface of the display panel. The optical modulation structure includes: a first transparent substrate and a second transparent substrate arranged opposite to each other, a charged particle arranged between the first transparent substrate and the second transparent substrate, and a first transparent electrode structure arranged between the first transparent substrate and the second transparent substrate and configured to form an electric field for driving the charged particle to move.

In a possible embodiment of the present disclosure, the charged particle include a white charged particle and/or colored charged particle.

In a possible embodiment of the present disclosure, a plurality of transparent capsule-like housings is arranged in an array form between the first transparent substrate and the second transparent substrate, and a plurality of charged particles is arranged in each transparent capsule-like housing.

In a possible embodiment of the present disclosure, a side of the display panel between the first surface and the second surface is a light-entering side, and, in the plurality of the transparent capsule-like housings, densities of the charged particles gradually decrease from a side close to the light-entering side to a side away from the light-entering side.

In a possible embodiment of the present disclosure, each transparent capsule-like housing has a trapezoid shape along a cross-section in a direction perpendicular to the first transparent substrate, and an upper base and a lower base of the trapezoid are arranged parallel to the display panel.

In a possible embodiment of the present disclosure, the first transparent electrode structure includes a first electrode and a second electrode, the second electrode includes a plurality of electrode blocks, an orthogonal projection of each electrode block onto the first transparent substrate coincides with an orthogonal projection of at least one of the transparent capsule-like housings onto the first transparent substrate, and each electrode block is connected to a voltage signal line separately.

In a possible embodiment of the present disclosure, the display panel is a liquid crystal display panel.

In a possible embodiment of the present disclosure, the liquid crystal display panel includes a common electrode, the first electrode in the optical modulation structure is a common electrode, and the common electrode of the liquid crystal display panel and the first electrode are configured to receive a same driving signal.

In a possible embodiment of the present disclosure, the display module is a transparent display module.

In a possible embodiment of the present disclosure, the display module further includes a control unit configured to control an electrical signal applied to the first transparent electrode structure, to control the charged particles to move.

In a possible embodiment of the present disclosure, the control unit includes: an ambient light detector configured to detect an ambient light brightness value; and a controller configured to stop applying an electrical signal to the first transparent electrode structure when the ambient light brightness value is greater than or equal to a predetermined value, so as to enable the charged particles to be arranged in a scattered manner; and apply an electrical signal to the first transparent electrode structure when the ambient light brightness value is smaller than the predetermined value, so as to enable the charged particles to move.

In a possible embodiment of the present disclosure, the controller is further configured to control a voltage applied to the first transparent electrode structure to gradually change from a side close to a light-entering side of the display panel to a side away from the light-entering side, so as to enable distances from the charged particles in the transparent capsule-like housings to the display panel in a direction perpendicular to the first transparent substrate to gradually decrease from the side close to the light-entering side to the side away from the light-entering side. And/or, the plurality of the transparent capsule-like housings includes a first region close to the light-entering side, the first region includes at least two transparent capsule-like housings, and the controller is further configured to control a voltage applied to the first transparent electrode structure corresponding to each transparent capsule-like housing at least in the first region to change periodically. And/or, the controller is further configured to control the first transparent electrode structure to be in a power-off state when a display image of the display panel is maintained within a predetermined period time.

The present disclosure further provides in some embodiments a display device including the above-mentioned display module and an auxiliary light source, and the auxiliary light source being arranged at a light-entering side of the display panel in the display module.

The technical effects of the embodiments of the present disclosure are as follows.

Based on the above, at least one of the first surface and the second surface opposite to each other of the display panel is the display surface, the optical modulation structure is arranged at the display surface of the display panel, so it is able to control the movement state of the charged particles in the optical modulation structure through an electrical signal applied to the first transparent electrode structure. When scattered light rays enter the optical modulation structure from the display surface of the display panel, part of the light rays are reflected by surfaces of the charged particles and enter the display panel again, so it is able to improve the light utilization rate. Especially, in the case of insufficient ambient light, the first transparent electrode structure in the optical modulation structure is powered, so as to enable the charged particles to move and be arranged according to practical needs, thereby to improve the light utilization rate, and meet the requirement on high uniformity of transparent display through the reflection effect of light rays by surfaces of the charged particles. In the case of sufficient ambient light, the charged particles are arranged in a scattered manner, so it is able to improve a viewing angle of the display panel in a scattering state. In addition, when the charged particles of the optical modulation structure are arranged according to practical needs after the first transparent electrode structure has been energized, a state of the charged particles before the first transparent electrode structure is deenergized may be maintained, so it is able to save the power consumption. Moreover, after passing through the display panel, the light from the light source is scattered by the charged particles, it is able to effectively avoid the occurrence of hotspot. Furthermore, the optical modulation structure may be arranged independent of a shape and size of a screen, and applied to display panels having various shapes and sizes.

DETAILED DESCRIPTION

Figure 1:
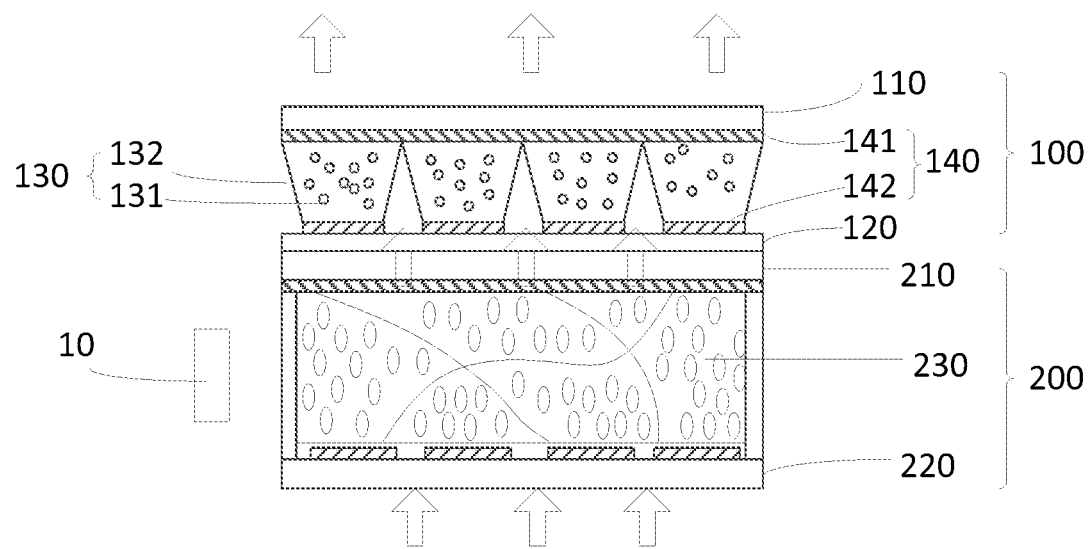
FIG. 1 is a schematic view showing a display module in a dark state when an auxiliary light source and an optical modulation structure are not energized in the case of sufficient ambient light according to an embodiment of the present disclosure.

In order to make the objects, the technical solutions and the advantages of the present disclosure more apparent, the present disclosure will be described hereinafter in a clear and complete manner in conjunction with the drawings and embodiments. Apparently, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Before the detailed description on the embodiments of the present disclosure, it is necessary to describe the related art as follows.

In the related art, a transparent display product has been widely used in exhibition stands, home appliances, and special consumer goods. The transparent display product has a display effect strongly dependent on external light, and as such it is necessary to arrange an auxiliary light source. Due to a blocking effect on the transparent display, a conventional backlight is no longer applied. Therefore, an edge-type auxiliary light source is usually applied to the transparent display product, one side of a display panel is a light-entering side, and an auxiliary light source is arranged at the light-entering side. When the light source is energized, light enters the display panel, and is transmitted, refracted and scattered inside the display panel. In this regard, it completely depends on an optical waveguide inside the display panel. Due to a large transmission loss and a short transmission distance of the light inside the display panel, a region of the display panel close to the light source is bright, a region of the display panel away from the light source side is dark, a display content is hardly visible, the display panel has uneven brightness and an imperfect display effect. In addition, due to an imperfect light guiding effect of the display panel and an imperfect light scattering effect inside the display panel, hotspot occurs severely, and the light source is light bar, it is unable applied to an irregular display panel.

A display module and a display device are provided in the embodiments of the present disclosure, so as to improve the light utilization rate and image uniformity.

FIGS. 1 to 4 and 7 are each a schematic view showing a display module according to an embodiment of the present disclosure.

As shown in FIGS. 1 to 4 and 7, the display module includes a display panel 200 and an optical modulation structure 100, the display panel 200 includes a first surface and a second surface opposite to each other, at least one of the first surface and the second surface is a display surface, and the optical modulation structure 100 is arranged on at least one of the first surface and the second surface of the display panel 200. The optical modulation structure 100 includes: a first transparent substrate 110 and a second transparent substrate 120 arranged opposite to each other, a charged particle 131 arranged between the first transparent substrate 110 and the second transparent substrate 120, and a first transparent electrode structure 140 arranged between the first transparent substrate 110 and the second transparent substrate 120 and configured to form an electric field for driving the charged particle 131 to move.

Based on the above, the optical modulation structure 100 is arranged at the display surface of the display panel 200, so it is able to control the movement state of the charged particle 131 in the optical modulation structure 100 through an electrical signal applied to the first transparent electrode structure 140. When scattered light rays enter the optical modulation structure 100 from the display surface of the display panel 200, part of the light rays are reflected by a surface of the charged particle 131 and enter the display panel again, so it is able to improve the light utilization rate inside a display region, so as to improve the uniformity of the display panel.

To be specific, in the case of insufficient ambient light, the first transparent electrode structure 140 in the optical modulation structure 100 is energized, so as to enable charged particles 131 to move and be arranged according to practical needs, thereby to improve the light utilization rate, and meet the requirement on high uniformity of transparent display through the reflection effect of light rays by surfaces of the charged particles 131. In the case of sufficient ambient light, the charged particles 131 are arranged in a scattered manner, so it is able to improve a viewing angle of the display panel in a scattering state. In addition, when the charged particles 131 of the optical modulation structure 100 are arranged according to practical needs after the first transparent electrode structure 140 has been energized, a state of the charged particles 131 before the first transparent electrode structure is deenergized may be maintained, so it is able to save the power consumption. Moreover, after passing through the display panel 200, the light from the light source is scattered by the charged particles 131, it is able to effectively avoid the occurrence of hotspot. Furthermore, the optical modulation structure 100 may be arranged independent of a shape and size of a screen, and applied to display panels having various shapes and sizes.

It should be appreciated that the display module may be a transparent display module, and the display panel 200 may be a transparent display panel, where the first transparent substrate 110 and the second transparent substrate 120 are each a substrate of a high transmittance. However, it should be appreciated that the display module is not limited to being applied to the transparent display product, and in practical applications, the display module may be applied to other types of display products, such as an ordinary opaque display panel.

A detailed description about the display module will be given below by taking a case where the display module is the transparent display module, and the display panel 200 is the transparent display panel 200 as an example.

In an exemplary embodiment of the present disclosure, the charged particle 131 include a white charged particle.

The charged particle 131 is a white charged particle, a size of the white charged particle is of a nanometer level, and a diameter thereof ranges from dozens of nanometers to hundreds of nanometers, which is invisible to the naked eyes, so it is able to achieve a transparent display through determining a distribution density of white charged particles. In addition, a light reflectivity of the white charged particle is higher than that of a colored charged particle, so it is able to improve the light reflectivity, thereby to improve the optical utilization. The white charged particle may be a white cationic charged particle or a white anionic charged particle.

In some embodiments of the present disclosure, the charged particle is not limited to the white charged particle, and may also be a colored charged particle, or a particle mixed by the white charged particle and the colored charged particle. For example, the colored charged particle may be a red charged particle, a blue charged particle, a yellow charged particle or a black charged particle, and a size of the colored charged particle is of a nanometer level, and a diameter thereof ranges from dozens of nanometers to hundreds of nanometers, which is invisible to the naked eyes, so it is also able to achieve a transparent display through determining a distribution density of colored charged particles. In addition, the colored charged particles may absorb light in a specific color or enhance light in a specific color, so it is able to reduce or increase the light in the specific color exiting the display module, thereby to adjust the display chromaticity of the final display module.

In an exemplary embodiment of the present disclosure, as shown in FIGS. 1 to 4, a plurality of transparent capsule-like housings 132 is arranged in an array form between the first transparent substrate 110 and the second transparent substrate 120, and a plurality of charged particles 131 is arranged in each transparent capsule-like housing 132.

The first transparent electrode structure 140 includes a first electrode 141 and a second electrode 142, the second electrode 142 includes a plurality of electrode blocks, an orthogonal projection of each electrode block onto the first transparent substrate 110 coincides with an orthogonal projection of at least one of the transparent capsule-like housings 132 onto the first transparent substrate 110, and each electrode block is connected to a voltage signal line separately.

Based on the above, the plurality of transparent capsule-like housings 132 is arranged in an array form between the first transparent substrate 110 and the second transparent substrate 120, and the charged particles 131 are arranged in each transparent capsule-like housing 132. Illustratively, a height of the transparent capsule-like housing 132 in a direction perpendicular to the first transparent substrate 110 is about 150 μm, and the diameter of each charged particle 131 ranges from dozens of nanometers to hundreds of nanometers, which is invisible to the naked eyes. Each transparent capsule-like housing 132 and the corresponding first electrode 141 and corresponding second electrode 142 form one ink-cell unit, so as to control the movement state of the charged particles 131 in each ink-cell unit separately, thereby to realize a desired particle arrangement state of the charged particles 131 through controlling each ink-cell unit separately according to actual needs.

It should be appreciated that, in some exemplary embodiments of the present disclosure, the first electrode 141 and the second electrode 142 of the first transparent electrode structure 140 are respectively located on the first transparent substrate 110 and the second transparent substrate 120. For example, the first electrode 141 is arranged at a side of the first substrate 110 facing the second substrate 120, and the second electrode 142 is arranged at a side of the second substrate 120 facing the first substrate 110. In other embodiments of the present disclosure, the first electrode 141 and the second electrode 142 of the first transparent electrode structure 140 may be located on a same substrate.

It should be further appreciated that, in the above-mentioned exemplary embodiments of the present disclosure, the orthogonal projection of each electrode block in the second electrode 142 onto the first transparent substrate 110 coincides with the orthogonal projection of one transparent capsule-like housing 132 onto the first transparent substrate 110, that is, each electrode block may correspond to one transparent capsule-like housing 132, so one transparent capsule-like housing 132 and the first electrode 141 as well as the electrode block of which the orthogonal projections onto the first transparent substrate 110 coincide with the orthogonal projection of the one transparent capsule-like housing 132 in the direction perpendicular to the first transparent substrate together form one ink-cell unit. In other embodiments of the present disclosure, the orthogonal projection of each electrode block in the second electrode 142 onto the first transparent substrate coincides with orthogonal projections of multiple transparent capsule-like housings 132 onto the first transparent substrate, that is, each electrode block in the second electrode 142 may correspond to multiple transparent capsule-like housings 132, and as such each electrode block and multiple transparent capsule-like housings 132 corresponding to the electrode block as well as the first electrode 141 together form one ink-cell unit. In other words, one ink-cell unit may include one transparent capsule-like housing 132 or multiple transparent capsule-like housings 132.

In addition, in the above-mentioned exemplary embodiments of the present disclosure, as shown in FIGS. 1 to 4, the first electrode 141 may be a planar electrode arranged corresponding to the entire first transparent substrate 110, and each electrode block in the second electrode 142 is separately connected to a signal line. In this regard, for different ink-cell units, electrical signals applied to the first electrode 141 may be the same, and it only needs to control electrical signals applied to the electrode blocks to be different, so as to achieve different arrangement states of the charged particles 131 in different ink-cell units.

It should be further appreciated that, in the above-mentioned exemplary embodiments of the present disclosure, each electrode block is separately connected to a voltage signal line, and in practical applications, it may also be a case where several electrode blocks form one unit connected to a same signal line.

In addition, in an exemplary embodiment of the present disclosure, as shown in FIGS. 1 to 5, one side of the display panel 200 is a light-entering side, and an auxiliary light source 10 is arranged at the light-entering side of the display panel 200. In the plurality of the transparent capsule-like housings, a density of the charged particles 131 in the transparent capsule-like housing 132 on a side close to the light-entering side is greater than a density of the charged particles 131 in the transparent capsule-like housing 132 on a side away from the light-entering side.

Due to a large transmission loss and a short transmission distance of the light inside a conventional edge-type transparent display panel, a region of the display panel close to the light source is bright, a region of the display panel away from the light source side is dark, a display content is hardly visible, the display panel has uneven brightness and an imperfect display effect. Hence, in order to improve the entire image uniformity, in the above-mentioned solution, the density of the charged particles 131 close to the light source is greater than the density of the charged particles 131 away from the light source (the density of the charged particles 131 is the quantity of the charged particles 131 in the transparent capsule-like housing 132). This is because when light rays enter the charged particles 131 from the display surface of the display panel, part of the light rays are reflected and enter the display panel again, and part of the light rays exit the optical modulation structure. The greater the density of the charged particles 131, the greater a probability where the light rays are reflected by the surfaces of the charged particles 131, that is, the more the light rays are reflected back to the display panel, and the less the light rays exit the optical modulation structure. Hence, when the density of the charged particles is large at the side close to the light source, it is able to reduce a brightness value at the side close to the light source, and improve a brightness value at the side away from the light source. In addition, the light rays reflected back to the display panel by the charged particles close to the light source may transmit in the display panel, it is able to further achieve an image effect of uniform display brightness.

Illustratively, in the plurality of the transparent capsule-like housings, densities of the charged particles 131 gradually decrease from the side close to the light-entering side to the side away from the light-entering side.

Based on the above, the density of the charged particles 131 varies linearly with a distance from the transparent capsule-like housing 132 to the light source, and the densities of the charged particles gradually decrease from the side close to light source to the side away from the light source, so as to further improve the display brightness uniformity.

It should be appreciated that, based on the above, when the densities of the charged particles 131 gradually decrease from the side close to the light-entering side to the side away from the light-entering side, it means that densities of the charged particles 131 in multiple transparent capsule-like housings decrease in a one-by-one manner in an arrangement direction from the side close to the light-entering side to the side away from the light-entering side. It may further be a case where, in the arrangement direction from the side close to the light-entering side to the side away from the light-entering side, N transparent capsule-like housings form one group, M groups of the transparent capsule-like housings are formed, where N is an integer greater than 1, M is an integer greater than 1, densities of the charged particles in the transparent capsule-like housings in each group are the same, and densities of the charged particles in the M transparent capsule-like housings decrease in a group-by-group manner.

Further, in one exemplary embodiment, as shown in FIGS. 1 to 4, each transparent capsule-like housing 132 has a trapezoid shape along a cross-section in a direction perpendicular to the first transparent substrate 110, and an upper base and a lower base of the trapezoid are arranged parallel to the display panel.

In the above-mentioned embodiment of the present disclosure, the transparent capsule-like housing has a trapezoid shape along a cross-section, and orthogonal projections of lower bases of the transparent capsule-like housings 132 onto the first transparent substrate may cover an entire display region of the display module. In some embodiments of the present disclosure, for example, as shown in FIGS. 1 to 4, the transparent capsule-like housing has an inverted trapezoid shape, and the white charged particles in the transparent capsule-like housing 132 are cationic particles. A direction of the electric field formed when an electric signal is applied to the first transparent electrode structure 140 is a direction of the white charged particles being driven to move from the side close to the display panel 200 to the side away from the display panel 200. For ease of description, when the white charged particles move from the side close to the display panel 200 to the side away from the display panel 200, it refers to that the white charged particles move upwards. When an electric signal is applied to the first transparent electrode structure 140, the white charged particles inside the transparent capsule-like housing 132 move upwards, and the transparent capsule-like housing 132 has a trapezoid shape along the cross-section, so it is able to ensure that orthogonal projections of the charged particles 131 in the transparent capsule-like housings 132 onto the first transparent substrate may cover the entire display region of the display panel 200, and the charged particles 131 are distributed evenly.

In some embodiments of the present disclosure, when the transparent capsule-like housing 132 has a trapezoid shape along the cross-section, a length L2 of the upper base is about 15 μm, a length L1 of the lower base is about 150 μm, and a height H thereof is about 150 μm. Of course, the above is merely for illustrative purposes and which is not particularly defined herein.

Figure 7:
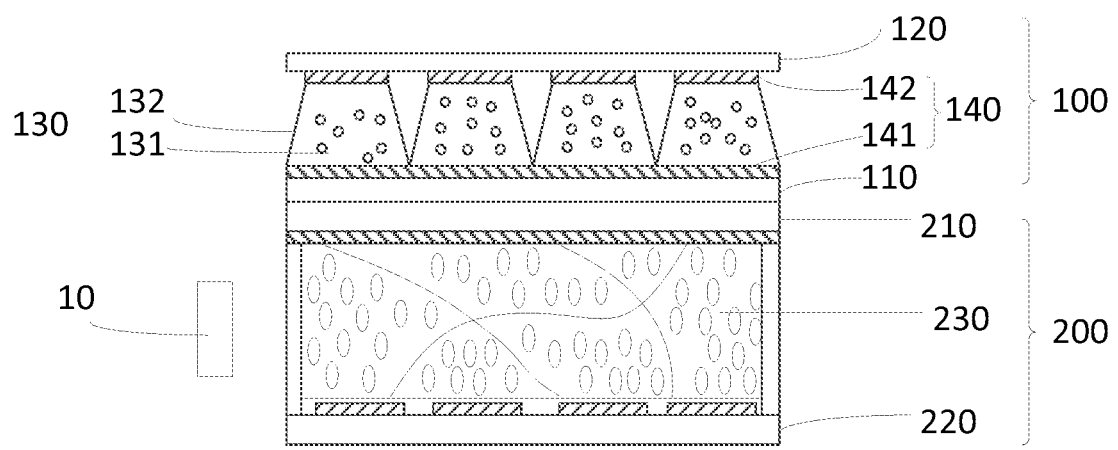
FIG. 7 is another schematic view showing the display module according to an embodiment of the present disclosure.

In some embodiments of the present disclosure, as shown in FIG. 7, the transparent capsule-like housing 132 may have a normal trapezoid shape along the cross-section, and a lower base thereof is located on a side of an upper base thereof close to the display panel 200. For example, when an electric signal is applied to the first transparent electrode structure 140, a direction of the electric field formed when an electric signal is applied to the first transparent electrode structure 140 is a direction of the white charged particles being driven to move from the side away from the display panel 200 to the side close to the display panel 200 (refers to that the white charged particles move downwards). When the transparent capsule-like housing 132 has a normal trapezoid shape along the cross-section, it is able to ensure that when the electrical signal is applied, orthogonal projections of the charged particles 131 in the transparent capsule-like housings 132 onto the first transparent substrate may cover the entire display region of the display panel 200, and the charged particles 131 are distributed evenly.

In addition, it should be appreciated that, in the above-mentioned embodiment of the present disclosure, when the transparent capsule-like housing 132 has a trapezoid shape along the cross-section, the following advantages may be achieved.

Because the transparent capsule-like housing 132 has a trapezoid shape along the cross-section, when the charged particles 131 move upwards or downwards in the transparent capsule-like housing 132 to different heights, areas of the orthogonal projections of the charged particles 131 onto the first transparent substrate 100 are different. Since the quantity of the charged particles 131 in each transparent capsule-like housing 132 is a certain number, when the charged particles 131 in each transparent capsule-like housing 132 move to different heights, a distribution density of the charged particles 131 in the transparent capsule-like housing 132 changes accordingly, and thus, through controlling the heights of the charged particles 131 moving to in different transparent capsule-like housings 132, it is able to control the distribution densities of the charged particles 131 in the transparent capsule-like housings 132 at different positions, so as to adjust the image display brightness at different positions of the display region, thereby to achieve the image effect of uniform display brightness. Of course, it is also able to adjust the display brightness of a partial region according to actual needs.

It should be appreciated that, in other embodiments of the present disclosure, the transparent capsule-like housing 132 may have another shape along the cross-section. For example, the transparent capsule-like housing 132 may have another shape along the cross-section in the direction perpendicular to the first transparent substrate 110, such as circular, elliptical, conical or rectangular. It should be appreciated that when the transparent capsule-like housing 132 may have a shape along the cross-section where an inner diameter thereof gradually changes, such as circular, elliptical or conical, it is also bale to achieve the technical effect of the embodiment where the transparent capsule-like housing has the trapezoid shape along the cross-section.

In addition, the display module further includes a control unit configured to control an electrical signal applied to the transparent electrode structure, to control the charged particles 131 to move.

Figure 9:
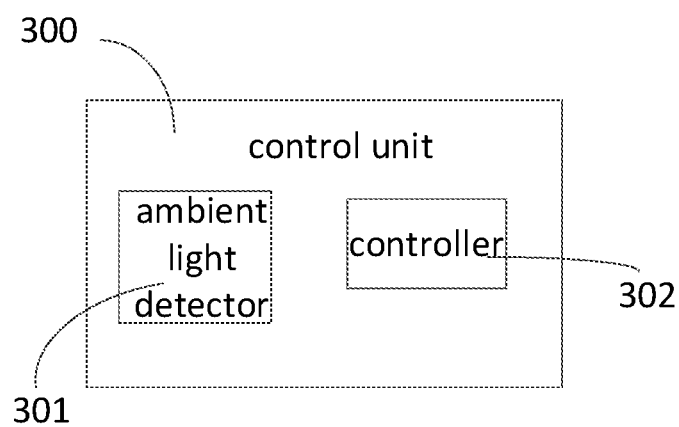
FIG. 9 is a block diagram of a control unit in the display module according to an embodiment of the present disclosure.

In some exemplary embodiments of the present disclosure, as shown in FIG. 9, the control unit 300 includes: an ambient light detector 301 configured to detect an ambient light brightness value; and a controller 302 configured to stop applying an electrical signal to the first transparent electrode structure 140 when the ambient light brightness value is greater than or equal to a predetermined value, so as to enable the charged particles 131 to be arranged in a scattered manner; and apply an electrical signal to the first transparent electrode structure 140 when the ambient light brightness value is smaller than the predetermined value, so as to enable the charged particles 131 to move.

Figure 2:
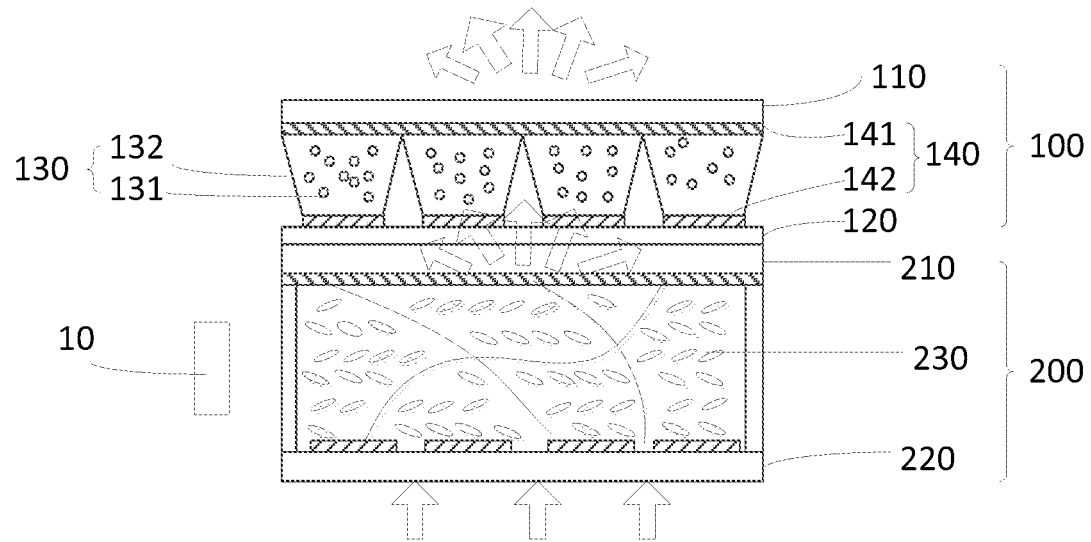
FIG. 2 is a schematic view showing the display module in a bright state when the auxiliary light source and the optical modulation structure are not energized in the case of sufficient ambient light according to an embodiment of the present disclosure.
Figure 3:
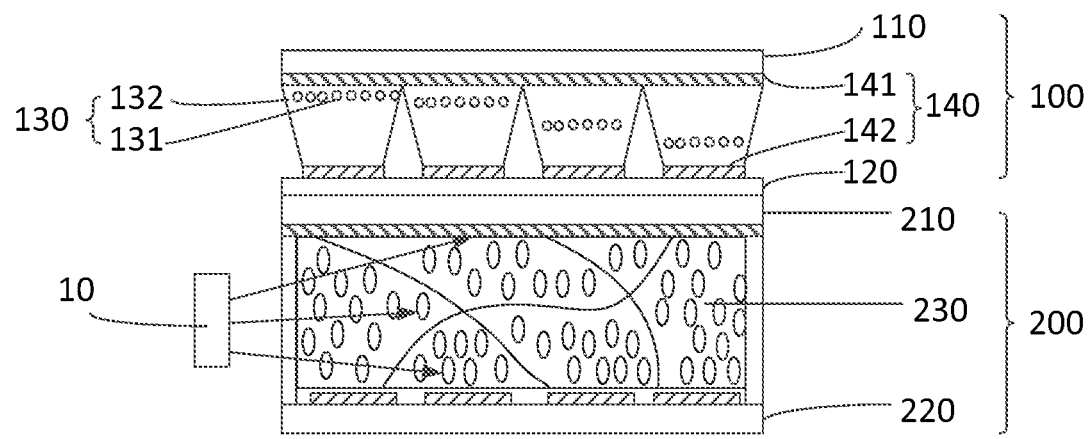
FIG. 3 is a schematic view showing the display module in a dark state when the auxiliary light source and the optical modulation structure are energized in the case of insufficient ambient light according to an embodiment of the present disclosure.
Figure 4:
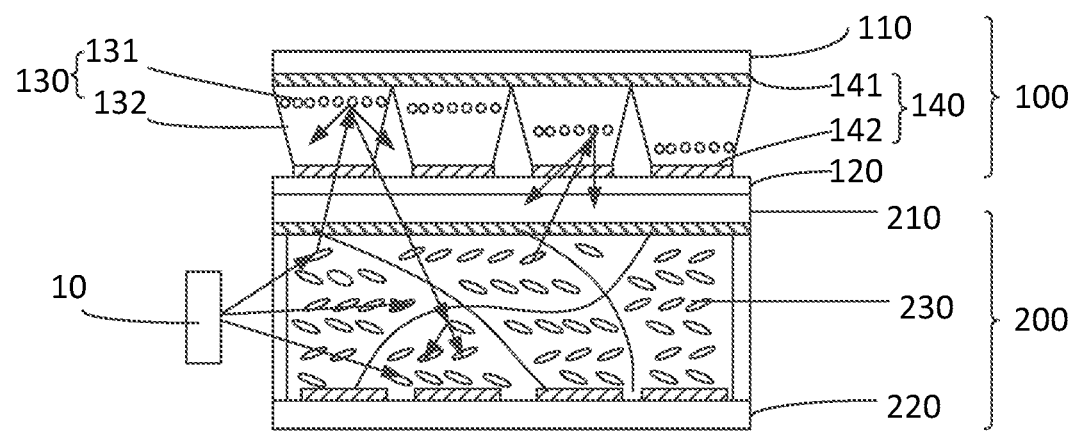
FIG. 4 is a schematic view showing the display module in a bright state when the auxiliary light source and the optical modulation structure are energized in the case of insufficient ambient light according to an embodiment of the present disclosure.
Figure 5:
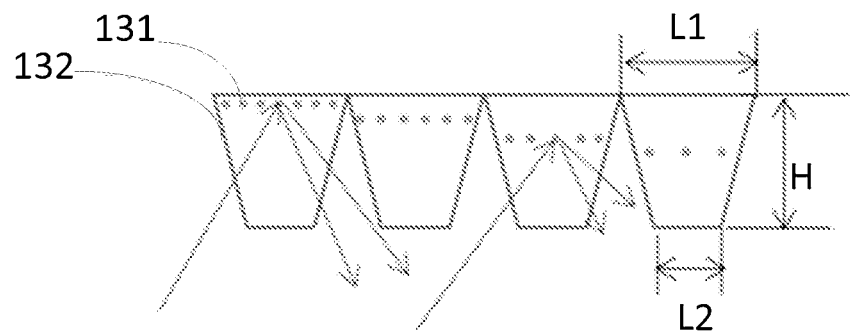
FIG. 5 is a schematic view showing a distribution state of charged particles in each transparent capsule-like housing when the optical modulation structure is energized in the display module according to an embodiment of the present disclosure, where a left side is a side close to a light source, and a right side is a side away from the light source.

Based on the above, one side of the display panel 200 is the light-entering side, and the auxiliary light source 10 is arranged at the light-entering side. As shown in FIGS. 1 and 2, in the case of sufficient ambient light, the auxiliary light source 10 and the optical modulation structure 100 are not energized, and the charged particles 131 are arranged in a scattered manner, and at this time, it is able for the charged particles in the optical modulation structure 100 to improve the viewing angle of the display panel 200 in a scattering state. As shown in FIGS. 3 and 4, in the case of insufficient ambient light, the auxiliary light source 10 and the first transparent electrode structure 140 in the optical modulation structure 100 are energized, the charged particles 131 are arranged according to practical needs, and light rays are reflected by the surfaces of the charged particles 131, it is able to improve the light utilization rate and meet the requirement on high uniformity of transparent display.

To be specific, in one exemplary embodiment, the controller 302 is configured to control a voltage applied to the first transparent electrode structure 140 to gradually change from a side close to a light-entering side of the display panel to a side away from the light-entering side, so as to enable distances from the charged particles 131 in the transparent capsule-like housings 132 to the display panel 200 in a direction perpendicular to the first transparent substrate 110 to gradually decrease from the side close to the light-entering side to the side away from the light-entering side.

Based on the above, in order to further improve image brightness uniformity, it is able to change the distribution height of the charged particles 131 in the transparent capsule-like housing 132 through controlling the driving voltage applied to the first transparent electrode structure, that is, change the distances from the charged particles 131 in the transparent capsule-like housings 132 to the display panel 200 in the direction perpendicular to the first transparent substrate 110. In the transparent capsule-like housings 132, the closer a distance from each transparent capsule-like housing 132 to the light source, the larger the distribution height of the charged particles 131.

For example, when the charged particles 131 are white cationic charged particles and move upwards under the control of the driving voltage, as the distances from transparent capsule-like housings 132 to the light source increase, the densities of the charged particles 131 in the transparent capsule-like housings 132 gradually decrease, and driving voltages gradually decrease. Accordingly, distribution heights of the driving particles gradually decrease, scattering angles of the light scattered by the white charged particles gradually decrease, so it is able to improve the entire image uniformity. Taking the white cationic charged particles as an example, the driving voltage applied to the first transparent electrode structure 140 may range from −8V to −15V.

In addition, in some embodiments of the present disclosure, the plurality of the transparent capsule-like housings 132 includes a first region close to the light-entering side, the first region includes at least two transparent capsule-like housings 132, and the controller 302 is configured to control a voltage applied to the first transparent electrode structure corresponding to each transparent capsule-like housing 132 at least in the first region to change periodically.

Figure 6:
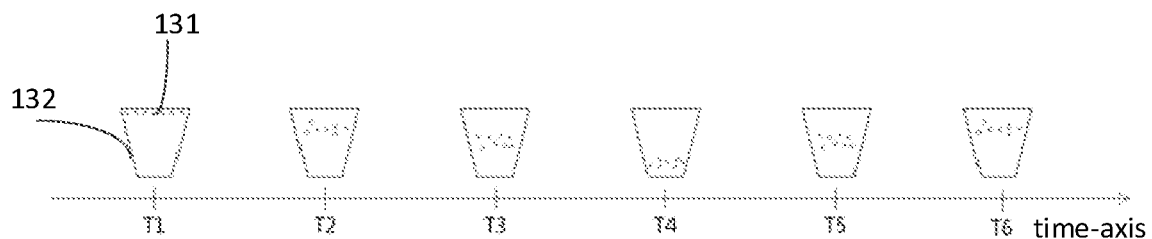
FIG. 6 is a schematic view showing a distribution state of charged particles within a period in transparent capsule-like housings of a first region close to the light source in the display module according to an embodiment of the present disclosure.

Based on the above, in order to avoid the occurrence of hotspot of the display module, distributions of the charged particles 131 in multiple transparent capsule-like housings 132 close to the light-entering side, i.e., the first region, may change periodically over time. As shown in FIG. 6, within one period, through changing the driving voltage of the charged particles 131 in the transparent capsule-like housings 132 close to the light-entering side, it is able to control the charged particles 131 to move in the transparent capsule-like housings 132, so as to change the scattering angle of the scattered light rays corresponding to the charged particles 131, thereby to change the convergence of original light beam of the light source, and avoid the occurrence of hotspot.

A refresh rate of the driving voltage each transparent capsule-like housing 132 in the first region ranges from 25 Hz to 100 Hz, and may be determined and adjusted according to practical applications.

In addition, in some embodiments of the present disclosure, the controller is configured to control the first transparent electrode structure 140 to be in a power-off state when a display image of the display panel 200 is maintained within a predetermined period time.

Based on the above, when an image is displayed, the first transparent electrode structure 140 is energized, after the charged particles 131 move to a specified position under the effect of an electric field, the first transparent electrode structure 140 may be deenergized, and positions of the charged particles 131 may be maintained due to bistability of the charged particles 131, so it is able to reduce the power consumption and drive the optical modulation structure 100 according to image needs.

It should be appreciated that the control unit may be a driving integrated circuit (IC) arranged on a display panel.

In addition, in some exemplary embodiments of the present disclosure, the display panel 200 is a liquid crystal display panel.

In one exemplary embodiment of the present disclosure, as shown in FIGS. 1 to 4, the liquid crystal display may include a third substrate 210 and a fourth substrate 220 opposite to each other to form a liquid crystal cell, a liquid crystal layer or a liquid crystal polymer layer or a dye liquid crystal layer 230 arranged between the third substrate 210 and the fourth substrate 220, and a second transparent electrode structure 240 arranged between the third substrate 210 and the fourth substrate 220, configured to form an electric field for driving the liquid crystal layer or the liquid crystal polymer layer or the dye liquid crystal layer 230, and includes a third electrode 241 and a fourth electrode 242.

Illustratively, the third electrode 241 is arranged on a side of the third substrate 210 facing the fourth substrate 220, and the fourth electrode 242 is arranged on a side of the fourth substrate 220 facing the third substrate 210. It should be appreciated that the third electrode 241 and the fourth electrode 242 may both be arranged on the third substrate 210 or the fourth substrate 220.

Based on the above, the display panel 200 may be the liquid crystal display panel 200, e.g., a Polymer Network Liquid Crystal (PNLC) transparent display panel, or a polymer dispersed liquid crystal (PDLC) transparent display panel. As compared with PDLC, each liquid crystal in PNLC is not a spherical-like (or ellipsoidal-like) droplet, and is arranged in a three-dimensional network of a polymer, so as to form a continuous network of channels.

A light path is drawn by taking the PNLC transparent display panel as an example in each of FIGS. 1 to 4 and 7, and the display panel is not limited to the PNLC transparent display panel.

For example, the display panel 200 may also be a dye-type transparent display panel, and the liquid crystal layer is a dye liquid crystal layer formed by a mixture of a liquid crystal matrix doped with dye molecules. When the light rays are transmitted in the dye-type transparent display panel, it is able for the optical modulation structure 100 to remarkably improve the light utilization due to the light absorption of the dye molecules.

In addition, in some exemplary embodiments of the present disclosure, as shown in FIGS. 1 to 4 and 10, the liquid crystal display panel includes a common electrode, the first electrode 141 in the optical modulation structure is a common electrode, and the common electrode of the liquid crystal display panel and the first electrode 141 are configured to receive a same driving signal.

Figure 10:
FIG. 10 is a top view of the display module according to an embodiment of the present disclosure, where only a common electrode of the display panel, a first electrode of the optical modulation structure and a driving integrated circuit (IC) are shown in order to facilitate the understanding of the present disclosure.

Based on the above, the common electrode of the liquid crystal display panel may be the third electrode 241 or the fourth electrode 242, the first electrode 141 in the optical modulation structure is a common electrode, and the common electrode of the liquid crystal display panel and the first electrode 141 may be configured to receive a same driving signal. FIG. 10 is a top view of the display module according to an embodiment of the present disclosure, where only the common electrode of the display panel, the first electrode of the optical modulation structure and the driving integrated circuit (IC) are shown in order to facilitate the understanding of the present disclosure. As shown in FIG. 10, and a common signal line 20 of the common electrode of the liquid crystal display panel and a common signal line 21 of the first electrode 141 in the optical modulation structure are connected to a driving IC 30, and may be connected to each other through silver paste dots so as to receive a same driving signal.

In addition, in some embodiments of the present disclosure, for example, the first electrode 141 is a planar electrode arranged corresponding to the entire first transparent substrate 110, the third electrode 241 is a planar electrode arranged corresponding to the entire third substrate 210 and serves as the common electrode of the liquid crystal display panel, and an electric signal (or referred to as driving signal) applied to the third electrode 241 is the same as the first electrode 141, so as to be driven simultaneously.

In some embodiments, the display module includes a total of four substrates, i.e., the first substrate, the second substrate, the third substrate and the fourth substrate each made of a high transmittance material. The first electrode 141 and the second electrode 142 are configured to drive the charged particles 131, the third electrode 241 and the fourth electrode 242 are configured to drive the liquid crystal or liquid crystal polymer or dye liquid crystal molecules in the liquid crystal layer of the display panel 200. The first electrode 141 and the third electrode 241 may be connected to each other through silver paste dots and further connected to a same driving electrode, and a source signal is applied to the second electrode 142 and the fourth electrode 242.

In addition, in an exemplary embodiment of the present disclosure, the first transparent substrate 110 is located on a side of the second transparent substrate 120 close to the display panel 200, and the third substrate 210 is located on a side of the fourth substrate 220 close to the optical modulation structure 100, where the first transparent substrate 110 is attached to the third substrate 210, or the first transparent substrate 110 may further serve as the third substrate 210.

In other embodiments of the present disclosure, as shown in FIGS. 1 to 4, the first transparent substrate 110 is located on a side of the second transparent substrate 120 away from the display panel 200, the third substrate 210 is located on a side of the fourth substrate 220 close to the optical modulation structure 100, the second transparent substrate 120 is attached to the third substrate 210, or the second transparent substrate 120 may further serve as the third substrate 210.

Figure 8:
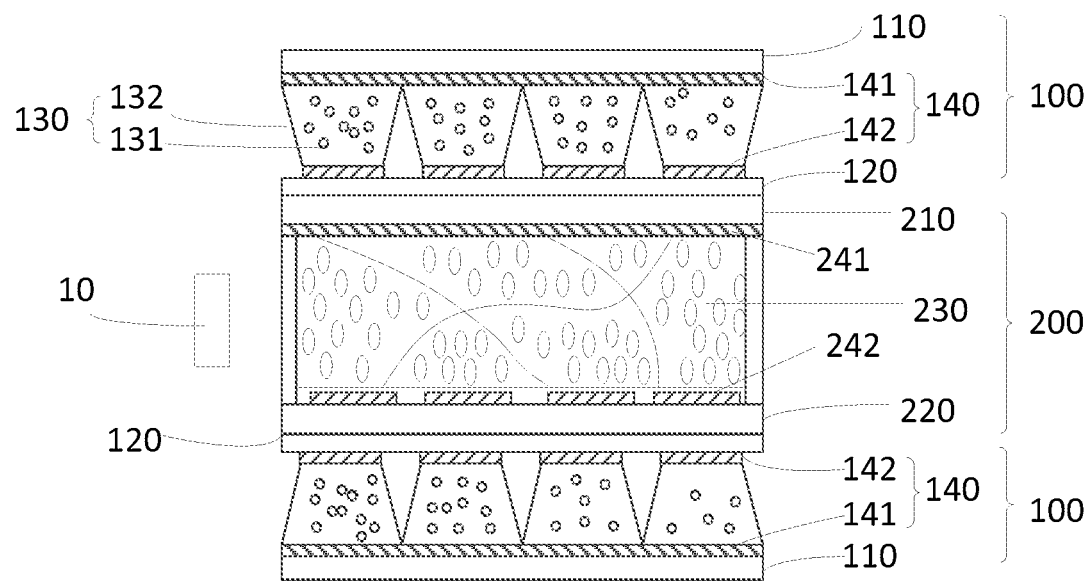
FIG. 8 is a schematic view showing the display module where optical modulation structures are arranged on two sides of a display panel respectively according to an embodiment of the present disclosure.

It should be appreciated that, in the above-mentioned embodiments of the present disclosure, a case where the optical modulation structure is arranged on one side of the display panel (i.e., one of the first surface or the second surface) as an example. In other embodiments of the present disclosure, the optical modulation structure may further be arranged on both sides of the display panel. For example, when the display panel 200 is a transparent display panel, the first surface and the second surface may each be a display surface. In this regard, the optical modulation structure may be arranged on the first surface or, the optical modulation structure may be arranged on the second surface, or, the optical modulation structure may be arranged on both the first surface and the second surface (as shown in FIG. 8, which is an example where optical modulation structures are arranged on two sides of a display panel respectively). For the ordinary opaque display panel, the optical modulation structure 100 may be arranged on only one side of the display surface.

In addition, the present disclosure provides in some embodiments a method for driving the above-mentioned display module, including: controlling an electrical signal applied to the first transparent electrode structure 140, so as to drive the charged particles 131 to move.

Illustratively, the controlling the electrical signal applied to the first transparent electrode structure 140, so as to drive the charged particles 131 to move includes: stopping applying the electrical signal to the first transparent electrode structure 140 when the ambient light brightness value is greater than or equal to a predetermined value, so as to enable the charged particles 131 to arrange in a scattered manner; and applying the electrical signal to the first transparent electrode structure 140 when the ambient light brightness value is smaller than the predetermined value, so as to enable the charged particles 131 to move.

Based on the above, in the case of insufficient ambient light, the first transparent electrode structure 140 in the optical modulation structure 100 is energized, so as to enable the charged particles 131 to move and be arranged according to practical needs, thereby to improve the light utilization rate, and meet the requirement on high uniformity of transparent display through the reflection effect of light rays by surfaces of the charged particles 131. In the case of sufficient ambient light, the charged particles 131 are arranged in a scattered manner, so it is able to improve a viewing angle of the display panel in a scattering state.

Illustratively, the applying the electrical signal to the first transparent electrode structure 140 when the ambient light brightness value is smaller than the predetermined value, so as to enable the charged particles 131 to move includes: enabling a voltage applied to the first transparent electrode structure 140 to gradually change from a side close to a light-entering side to a side away from the light-entering side, so as to enable distances from the charged particles 131 in the transparent capsule-like housings 132 to the display panel 200 in a direction perpendicular to the first transparent substrate 110 to gradually decrease from the side close to the light-entering side to the side away from the light-entering side.

Based on the above, in order to further improve image brightness uniformity, it is able to change the distribution height of the charged particles 131 in the transparent capsule-like housing 132 through controlling the driving voltage applied to the first transparent electrode structure, that is, change the distances from the charged particles 131 in the transparent capsule-like housings 132 to the display panel 200 in the direction perpendicular to the first transparent substrate 110. In the transparent capsule-like housings 132, the closer a distance from each transparent capsule-like housing 132 to the light source, the larger the distribution height of the charged particles 131.

For example, when the charged particles 131 are white cationic charged particles and move upwards under the control of the driving voltage, as the distances from transparent capsule-like housings 132 to the light source increase, the densities of the charged particles 131 in the transparent capsule-like housings 132 gradually decrease, and driving voltages gradually decrease. Accordingly, distribution heights of the driving particles gradually decrease, scattering angles of the light scattered by the white charged particles gradually decrease, so it is able to improve the entire image uniformity. Taking the white cationic charged particles as an example, the driving voltage applied to the first transparent electrode structure 140 may range from −8V to −15V.

In addition, in some embodiments of the present disclosure, the plurality of the transparent capsule-like housings 132 includes a first region close to the light-entering side, the first region includes at least two transparent capsule-like housings 132, and a voltage applied to the first transparent electrode structure corresponding to each transparent capsule-like housing 132 at least in the first region varies periodically.

Based on the above, in order to avoid the occurrence of hotspot of the display module, distributions of the charged particles 131 in multiple transparent capsule-like housings 132 close to the light-entering side, i.e., the first region, may change periodically over time. As shown in FIG. 6, within one period, through changing the driving voltage of the charged particles 131 in the transparent capsule-like housings 132 close to the light-entering side, it is able to control the charged particles 131 to move in the transparent capsule-like housings 132, so as to change the scattering angle of the scattered light rays corresponding to the charged particles 131, thereby to change the convergence of original light beam of the light source, and avoid the occurrence of hotspot.

In addition, for example, the applying the electrical signal to the first transparent electrode structure 140 when the ambient light brightness value is smaller than the predetermined value, so as to enable the charged particles 131 to move includes: controlling the first transparent electrode structure 140 to be in a power-off state when a display image of the display panel 200 is maintained within a predetermined period time.

Based on the above, when the charged particles 131 of the optical modulation structure 100 are arranged according to practical needs after the first transparent electrode structure 140 has been energized, a state of the charged particles before the first transparent electrode structure is deenergized may be maintained, so it is able to save the power consumption.

In addition, the present disclosure further provides in some embodiments a display device including an auxiliary light source 10 and the above-mentioned display module, and the auxiliary light source 10 being arranged at a light-entering side of the display panel 200 in the display module.

The display device may be applied to various display devices, e.g., a transparent display product such as an exhibition stand, a home appliance.

Some descriptions will be given as follows.

(1) The drawings merely relate to structures involved in the embodiments of the present disclosure, and the other structures may refer to those known in the art.

(2) For clarification, in the drawings for describing the embodiments of the present disclosure, a thickness of a layer or region is zoomed out or in, i.e., these drawings are not provided in accordance with an actual scale. It should be appreciated that, in the case that such an element as layer, film, region or substrate is arranged "on" or "under" another element, it may be directly arranged "on" or "under" the other element, or an intermediate element may be arranged therebetween.

(3) In the case of no conflict, the embodiments of the present disclosure and the features therein may be combined to acquire new embodiments.

The above embodiments are merely for illustrative purposes, but shall not be construed as limiting the scope of the present disclosure. The scope of the present disclosure shall be subject to the scope defined by the appended claims.

What is claimed is:

1. A display module, comprising a display panel, wherein the display panel comprises a first surface and a second surface opposite to each other, at least one of the first surface and the second surface is a display surface, the display module further comprises an optical modulation structure arranged on at least one of the first surface and the second surface of the display panel, and the optical modulation structure comprises:
    a first transparent substrate and a second transparent substrate arranged opposite to each other;
    a charged particle arranged between the first transparent substrate and the second transparent substrate; and
    a first transparent electrode structure arranged between the first transparent substrate and the second transparent substrate, and configured to form an electric field for driving the charged particle to move;
    wherein a plurality of transparent capsule-like housings is arranged in an array form between the first transparent substrate and the second transparent substrate, and a plurality of charged particles is arranged in each transparent capsule-like housing;
    wherein a side of the display panel between the first surface and the second surface is a light-entering side, and, among the plurality of the transparent capsule-like housings, a density of the charged particles in a transparent capsule-like housing close to the light-entering side is greater than a density of the charged particles in a transparent capsule-like housing away from the light-entering side.

2. The display module according to claim 1, wherein the charged particle comprises a white charged particle and/or colored charged particle.

3. The display module according to claim 1, wherein each transparent capsule-like housing has a trapezoid shape along a cross-section in a direction perpendicular to the first transparent substrate, and an upper base and a lower base of the trapezoid are arranged parallel to the display panel.

4. The display module according to claim 1, wherein the first transparent electrode structure comprises a first electrode and a second electrode, the second electrode comprises a plurality of electrode blocks, an orthogonal projection of each electrode block onto the first transparent substrate coincides with an orthogonal projection of at least one of the transparent capsule-like housings onto the first transparent substrate, and each electrode block is connected to a voltage signal line separately.

5. The display module according to claim 4, wherein the display panel is a liquid crystal display panel.

6. The display module according to claim 5, wherein the liquid crystal display panel comprises a common electrode, the first electrode in the optical modulation structure is a common electrode, and the common electrode of the liquid crystal display panel and the first electrode are configured to receive a same driving signal.

7. The display module according to claim 1, wherein the display module is a transparent display module.

8. The display module according to claim 1, further comprising a control unit configured to control an electrical signal applied to the first transparent electrode structure, to control the charged particles to move.

9. The display module according to claim 8, wherein the control unit comprises:
    an ambient light detector configured to detect an ambient light brightness value; and a controller configured to stop applying an electrical signal to the first transparent electrode structure when the ambient light brightness value is greater than or equal to a predetermined value, so as to enable the charged particles to be arranged in a scattered manner; and apply an electrical signal to the first transparent electrode structure when the ambient light brightness value is smaller than the predetermined value, so as to enable the charged particles to move.

10. The display module according to claim 9, wherein the controller is further configured to control a voltage applied to the first transparent electrode structure to gradually change from a side close to a light-entering side of the display panel to a side away from the light-entering side, so as to enable distances from the charged particles in the transparent capsule-like housings to the display panel in a direction perpendicular to the first transparent substrate to gradually decrease from the side close to the light-entering side to the side away from the light-entering side.

11. A display device, comprising the display module according to claim 1 and an auxiliary light source, and the auxiliary light source being arranged at a light-entering side of the display panel in the display module.

12. The display module according to claim 9, wherein the plurality of the transparent capsule-like housings comprises a first region close to the light-entering side, the first region comprises at least two transparent capsule-like housings, and the controller is further configured to control a voltage applied to the first transparent electrode structure corresponding to each transparent capsule-like housing at least in the first region to change periodically.

13. The display module according to claim 9, wherein the controller is further configured to control the first transparent electrode structure to be in a power-off state when a display image of the display panel is maintained within a predetermined period time.

14. A method for driving the display module according to claim 1, comprising: controlling an electrical signal applied to the first transparent electrode structure, to drive the charged particles to move.

15. The method according to claim 14, wherein the controlling the electrical signal applied to the first transparent electrode structure, to drive the charged particles to move comprises: stopping applying the electrical signal to the first transparent electrode structure when the ambient light brightness value is greater than or equal to a predetermined value, to enable the charged particles to arrange in a scattered manner; and applying the electrical signal to the first transparent electrode structure when the ambient light brightness value is smaller than the predetermined value, to enable the charged particles to move.

16. The method according to claim 15, wherein the applying the electrical signal to the first transparent electrode structure when the ambient light brightness value is smaller than the predetermined value, to enable the charged particles to move comprises: enabling a voltage applied to the first transparent electrode structure to gradually change from a side close to a light-entering side to a side away from the light-entering side, to enable distances from the charged particles in the transparent capsule-like housings to the display panel in a direction perpendicular to the first transparent substrate to gradually decrease from the side close to the light-entering side to the side away from the light-entering side.

17. The method according to claim 15, wherein the plurality of the transparent capsule-like housings comprises a first region close to the light-entering side, the first region comprises at least two transparent capsule-like housings, and the applying the electrical signal to the first transparent electrode structure when the ambient light brightness value is smaller than the predetermined value, to enable the charged particles to move comprises: enabling a voltage applied to the first transparent electrode structure corresponding to each transparent capsule-like housing at least in the first region to vary periodically.

18. The method according to claim 15, wherein the applying the electrical signal to the first transparent electrode structure when the ambient light brightness value is smaller than the predetermined value, so as to enable the charged particles to move comprises: controlling the first transparent electrode structure to be in a power-off state when a display image of the display panel is maintained within a predetermined period time.

\* \* \* \* \*